2,840,552
COBALT COMPLEXES OF MONOAZO DYES

Robert Frederic Michel Sureau, Enghien-les-Bains, and Georges Raymond Henry Mingasson, Paris, France, assignors to Compagnie Française des Matières Colorantes, Paris, France, a French company No Drawing. Application July 25, 1955
Serial No. 524,288

Claims priority, application France July 26, 1954

6 Claims. (Cl. 260—146)

The present invention relates to dyestuffs of the general formula:

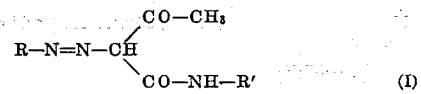  (I)

in which R represents the residue of a diazotizable base having, in the ortho position to the $NH_2$ group, a group capable of taking part in the formation of a metalliferous complex, but containing neither an $SO_3H$ group nor a COOH group other than the COOH group which may eventually be present in the ortho position to the $NH_2$ group, and R' represents a heterocyclic nucleus, especially a benzthiazole nucleus, which may carry besides hydrogen atoms substitutents which do not confer solubility, such as halogen atoms, and alkyl, aryl, alkoxy or alkylthio groups. The invention also relates to the metalliferous complexes of the dyestuffs.

These dyestuffs can be obtained by diazotizing a base of the formula $R-NH_2$ and coupling the diazo compound thus obtained with a coupling agent of the general formula:

  (II)

R and R' having the same significance as above. The dyes may then be converted into metalliferous complexes.

Among the groups capable of taking part in the formation of a metalliferous complex, and which must be found in the ortho position to the $NH_2$ group of the diazotizable bases utilisable as starting materials for the preparation of the dyestuffs which are the object of the invention, there may be mentioned the —OH, —$OCH_3$, —O—$CH_2$—COOH, and —COOH groups. The diazotizable bases may also contain other substituents such as halogen atoms and the alkyl, —$OCH_3$, —$NO_2$, acylamino, arylamino, —$SO_2NH_2$, alkylsulphonylamino, arylsulphonylamino, —CO-alkyl, and sulphone (—$SO_2CH_3$, —$SO_2C_2H_5$ for example) groups.

The coupling agents used are those of the general Formula II. They may consist, for example, of the acylacetyl derivatives of dihydrothioparatoluidine, of the acylacetyl derivatives described in U. S. Patents Nos. 2,195,011 and 2,500,093, of the acylacetyl derivatives of 2-aminobenzthiazole and its derivatives substituted by groups which do not confer solubility, and of the acylacetyl derivatives of aminocarbazoles.

The conversion of the mono-azo dyestuff thus prepared into metalliferous dyes may take place according to any generally known method of metallization; in particular, it can be effected by metallising treatments which lead to metalliferous complexes containing less than one atom of the complexing metal per molecule of mono-azo dye. All the methods leading to complexes which correspond to this last constitution can be used, and among these must be included those employing chroming in presence of amides or of ammonium salts of carboxylic acids, of aromatic ortho-hydroxycarbocylic acids, of aliphatic hydroxycarbocylic acids, of aminocarbocylic acids, heating in the alkali metal salts of aliphatic monocarboxylic acids containing water of crystallisation in the presence of a metallising agent, chroming in the presence of organic solvents, heating in aqueous solution in presence of a salt of cobalt, nickel, copper, iron, manganese or aluminium and of an excess of caustic soda, if desired in the presence of an aliphatic hydroxycarbocylic acid, the reaction of the non-metallised dyestuff with a metallising agent in the presence of another metallisable dyestuff, or the reaction of the non-metallised dyestuff with a metalliferous dyestuff containing one molecule of metal per molecule of dyestuff.

The metalliferous dyestuffs obtained according to the present invention may be employed for the coloration of organic solvents, lacquers, varnishes and materials based on cellulosic esters and ethers. Some of these dyestuffs, especially those containing and —$SO_2NH_2$, —$SO_2NH$—$CH_3$, —$SO_2CH_3$, or —$SO_2C_2H_5$ group in the residue R of the general Formula I, are capable of dyeing, in a neutral or weak acetic acid bath, wool, natural silk, leather, animalised fibres, superpolyamides and superpolyurethanes, giving shades which show excellent general fastness, while the vegetable and acetate rayon fibres are left uncoloured.

The invention will be more clearly understood by reference to the following examples, in which the parts indicated are parts by weight, and which are purely illustrative.

Example 1

2.3 parts of 2-acetoacetylamino-benzthiazole are dissolved in 30 parts of water and 2 parts of 36° Bé. soda lye. Into this is gradually run a solution of the diazo compound obtained by diazotizing a solution of 2.3 parts of 2-amino-4-sulphonamido-1-hydroxy-benzene in 50 parts of water and 2.5 parts of 22° Bé. hydrochloric acid by the addition of 5 parts by volume of a solution of 2 N sodium nitrite between 0° C. and +5° C. The alkalinity of the medium is maintained by the addition of a solution of sodium carbonate. The mixture is agitated for a further hour at 30–40° C., then the yellow dyestuff which is precipitated is filtered, washed with a little cold water and dried at 60° C.

Example 2

A solution of one part of the dyestuff from the previous example in 50 parts of water to which soda lye has been added so that the pH may be in the region of 10, is brought to boiling under reflux. 7.5 parts by volume of a solution of sodium cobaltotartrate containing 14.75 grammes of cobalt per litre are added. The dyestuff rapidly becomes soluble. When a drop on filter paper no longer changes colour with acetic acid, the mixture is allowed to cool and the dyestuff is precipitated by sodium chloride, and is filtered and dried. This dyestuff dyes wool from an ammonium acetate bath in a yellow shade, which is very fast to light and possessed of good fastness to humidity tests.

Example 3

In Example 1, the 2-acetoacetylamino-benzthiazole is replaced by 3.2 parts of 5-chloro-6-acetoacetylamino-2-methylthio-benzthiazole. A solution of 1.2 parts of the dyestuff obtained in 50 parts of water, to which soda lye has been added to bring the pH to 10, is boiled under reflux. 7.5 parts by volume of a solution of sodium chromotartrate, containing 10.4 g. of chromium per litre, are added. After 5 hours, the mixture is left to cool and is precipitated by sodium chloride and a little sodium bicarbonate, filtered and the precipitate dried. From a neutral bath, the dyestuff dyes wool an orange-yellow.

Other examples are summarised in the following table:

| Example | Base diazotized | Coupling component | Colour on wool of the complex from— | |
|---|---|---|---|---|
| | | | chromium | cobalt |
| 4 | 2-amino-4-sulphonamido-1-hydroxy-benzene. | Cl-benzthiazole-CO-NH-CH$_2$-CO-CH$_3$ (C-H at 2-position) | pale yellow | golden yellow. |
| 5 | do | CO-CH$_3$-CH$_2$-CO-NH-CH$_3$ benzthiazole with C-OC$_2$H$_5$ | reddish yellow | pale yellow. |
| 6 | do | H$_3$C-benzthiazole-CO-NH-CH$_2$-CO-CH$_3$ with C-SC$_2$H$_5$ | golden yellow | golden yellow. |
| 7 | do | benzthiazole-CO-NH-CH$_2$-CO-CH$_3$ with C-S-CH$_3$ | do | Do. |
| 8 | do | CO-CH$_3$-CH$_2$-CO-NH-CH$_3$ benzthiazole with C-S-CH$_3$ | reddish yellow | bright golden yellow. |
| 9 | do | CH$_3$-benzthiazole-CO-NH-CH$_2$-CO-CH$_3$ with C-S-CH$_3$ | yellow orange | golden yellow. |
| 10 | do | CH$_3$O-benzthiazole-CO-NH-CH$_2$-CO-CH$_3$ with C-S-CH$_3$ | pale yellow | reddish yellow. |
| 11 | do | Cl-benzthiazole-CO-NH-CH$_2$-CO-CH$_3$ with C-S-CH$_3$ | yellowish orange | bright golden yellow. |
| 12 | do | benzthiazole-CO-NH-CH$_2$-CO-CH$_3$ with C-S-C$_2$H$_5$ | yellow orange | golden yellow. |

| Example | Base diazotized | Coupling component | Colour on wool of the complex from— chromium | Colour on wool of the complex from— cobalt |
|---|---|---|---|---|
| 13 | do | [structure: benzothiazole with CO-CH₃, CH₂, CO-NH-, CH₃O-, C-S-C₂H₅] | reddish yellow | pale yellow. |
| 14 | do | [structure: benzothiazole with CH₃O-, CO-NH-, CH₂, CO-CH₃, C-S-C₂H₅] | orange yellow | yellow. |
| 15 | do | [structure: benzothiazole with Cl-, CO-NH-, CH₂, CO-CH₃, C-S-C₂H₅] | do | Do. |
| 16 | do | [structure: benzothiazole with CO-CH₃, CH₂, CO-NH-, CH₃O-, C-OH₃] | pale reddish yellow | bright golden yellow. |
| 17 | do | [structure: benzothiazole with CH₃O-, CO-NH-, CH₂, CO-CH₃, CH] | orange yellow | golden yellow. |
| 18 | do | [structure: benzothiazole with CO-CH₃, CH₂, CO-NH-, CH₃O-, C-OC₂H₅] | reddish yellow | pale yellow. |
| 19 | do | [structure: benzothiazole with CH₃O-, CO-NH-, CH₂, CO-CH₃, C-OC₂H₅] | yellowish orange | bright golden yellow. |
| 20 | do | [structure: benzothiazole with CH₃O-, CO-NH-, CH₂, CO-CH₃, C-OCH₃] | golden yellow | pale yellow. |
| 21 | do | [structure: benzothiazole with CO-CH₃, CH₂, CO-NH-, C-OCH₃] | | greenish yellow. |
| 22 | do | [structure: benzothiazole with CH₃-, CO-NH-, CH₂, CO-CH₃, C-OCH₃] | orange yellow | golden yellow. |

| Example | Base diazotized | Coupling component | Colour on wool of the complex from — chromium | cobalt |
|---|---|---|---|---|
| 23 | ...do... | (structure) | reddish yellow | yellow. |
| 24 | ...do... | (structure) | yellowish orange | bright golden yellow. |
| 25 | ...do... | (structure) | pale yellow | golden yellow. |
| 26 | ...do... | (structure) | orange yellow | Do. |
| 27 | 4-nitro-2-amino-phenol | (structure) |  | orange yellow. |
| 28 | 4-chloro-2-amino-5-sulphon-amido-phenol | (structure) | yellow orange | Do. |

We claim:
1. The cobalt complexes of a mono-azo dyestuff selected from those having the following formulae:

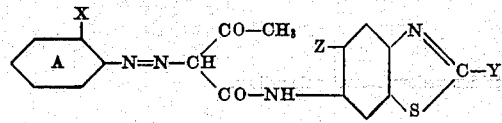

and

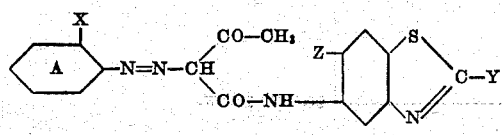

in which X represents a member selected from the group consisting of the —OH and —COOH groups, the benzene nucleus A is substituted by members selected from the group consisting of hydrogen and chlorine atoms and the methyl, nitro, acylamino, sulphonamido, monomethylsulphonylamino, dimethylsulphonylamino, isopropylsulphonylamino, methylsulphone and ethylsulphone groups, Y represents a member selected from the group consisting of the hydrogen atom and the methyl, ethyl, phenyl, methoxy, ethoxy, methylthio and ethylthio groups and Z represents a member selected from the group consisting of the hydrogen and chlorine atoms and the methyl, ethyl, methoxy and ethoxy groups which complexes contain one atom of cobalt per two molecules of dyestuff.

2. The cobalt complexes of a mono-azo dyestuff selected from those having the following formulae:

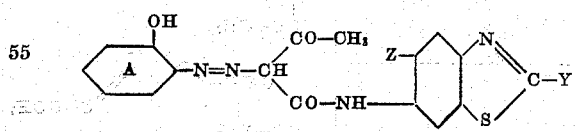

and

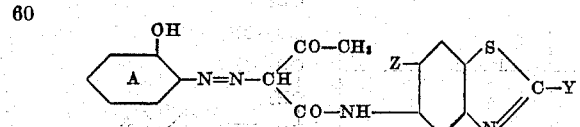

in which the benzene nucleus A is substituted by members selected from the group consisting of hydrogen and chlorine atoms and the nitro and sulphonamido groups, Y represents a member selected from the group consisting of the hydrogen atom and the methyl, ethyl, phenyl, methoxy, ethoxy, methylthio and ethylthio groups and Z represents a member selected from the group consisting of the hydrogen and chlorine atoms and the methyl, ethyl, methoxy and ethoxy groups which complexes contain one atom of cobalt per two molecules of dyestuff.

3. The cobalt complex of the mono-azo dyestuff of the formula:

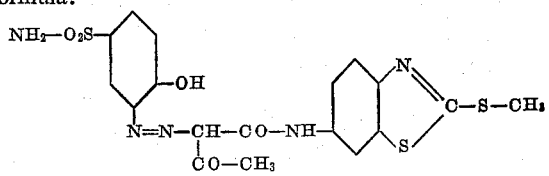

which complex contains one atom of cobalt per 2 molecules of dyestuff.

4. The cobalt complex of the mono-azo dyestuff of the formula:

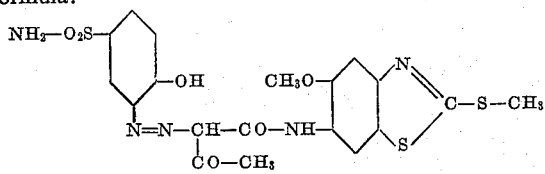

which complex contains one atom of cobalt per 2 molecules of dyestuff.

5. The cobalt complex of the mono-azo dyestuff of the formula:

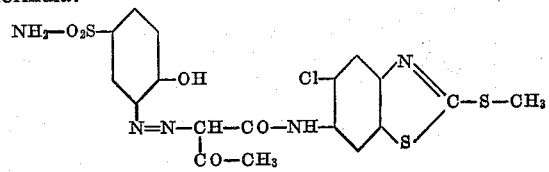

which complex contains one atom of cobalt per 2 molecules of dyestuff.

6. The cobalt complex of the mono-azo dyestuff of the formula:

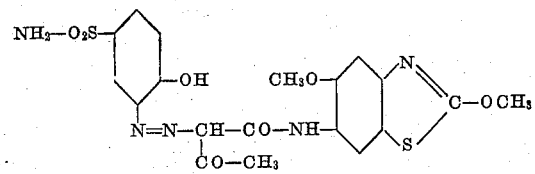

which complex contains one atom of cobalt per 2 molecules of dyestuff.

References Cited in the file of this patent

UNITED STATES PATENTS

| | | |
|---|---|---|
| 2,030,327 | Schrader et al. | Feb. 11, 1936 |
| 2,195,011 | Petitcolas et al. | Mar. 26, 1940 |
| 2,499,133 | Conrad | Feb. 28, 1950 |
| 2,500,093 | Petitcolas et al. | Mar. 7, 1950 |

OTHER REFERENCES

Venkataraman: Synthetic Dyes, vol. 1, 1952, pps. 540–541.